(12) United States Patent
Pishehvari et al.

(10) Patent No.: US 11,668,814 B2
(45) Date of Patent: Jun. 6, 2023

(54) METHODS AND SYSTEMS FOR DETERMINING AN INITIAL EGO-POSE FOR INITIALIZATION OF SELF-LOCALIZATION

(71) Applicant: APTIV TECHNOLOGIES LIMITED, St. Michael (BB)

(72) Inventors: Ahmad Pishehvari, Wuppertal (DE); Stephanie Lessmann, Erkrath (DE)

(73) Assignee: APTIV TECHNOLOGIES LIMITED, St. Michael (BB)

( * ) Notice: Subject to any disclaimer, the term of this patent is extended or adjusted under 35 U.S.C. 154(b) by 254 days.

(21) Appl. No.: 17/106,710

(22) Filed: Nov. 30, 2020

(65) Prior Publication Data

US 2021/0173075 A1 Jun. 10, 2021

(30) Foreign Application Priority Data

Dec. 5, 2019 (EP) ..................................... 19213740

(51) Int. Cl.
*G01S 13/89* (2006.01)
(52) U.S. Cl.
CPC ..................................... *G01S 13/89* (2013.01)
(58) Field of Classification Search
CPC ....................................................... G01S 13/89
See application file for complete search history.

(56) References Cited

U.S. PATENT DOCUMENTS

2018/0101932 A1* 4/2018 Kwon .................. G06T 7/50
2021/0116914 A1* 4/2021 Ren ..................... G05D 1/0231

FOREIGN PATENT DOCUMENTS

CN 109579849 A 4/2019

OTHER PUBLICATIONS

Guanghui Cen, Nobuto Matsuhira, Junko Hirokawa, Hideki Ogawa and Ichiro Hagiwara, "Service robot localization using improved Particle filter," 2008 IEEE International Conference on Automation and Logistics, 2008, pp. 2454-2459, doi: 10.1109/ICAL.2008.4636580. (Year: 2008).*
Cen, et al., Service Robot Localization Using Improved Particle Filter, Proceedings of the IEEE International Conference on Automation and Logistics, Qingdao, China, Sep. 2008, pp. 2454-2459.
Extended European Search Report for Application No. EP 19213740.4 dated May 28, 2020.
Liu, et al., Mobile Robots Global Localization Using Adaptive Dynamic Clustered Particle Filters, Proceedins of the 2007 IEEE/RSJ International Conference on Intelligent Robots and Systems, San Diego, CA, USA, Oct. 29-Nov. 2, 2007, pp. 1059-1064.

(Continued)

*Primary Examiner* — Peter M Bythrow
*Assistant Examiner* — Nazra Nur Waheed
(74) *Attorney, Agent, or Firm* — Carlson, Gaskey & Olds, P.C.

(57) ABSTRACT

A computer-implemented method for determining an initial ego-pose for initialization of self-localization includes providing a plurality of particles in a map; grouping the particles in a plurality of clusters, each cluster comprising a respective subset of the plurality of particles; during particle filtering, injecting particles based on the plurality of clusters; and determining an initial ego-pose based on the particle filtering.

12 Claims, 6 Drawing Sheets

(56) References Cited

OTHER PUBLICATIONS

Milstein, et al., Robust Global Localization Using Clustered Particle Filtering, AAA1-02 Proceedings. Copyright 2002, American Association for Artificial Intelligence (www.aaai.org), pp. 581-586.

\* cited by examiner

METHODS AND SYSTEMS FOR DETERMINING AN INITIAL EGO-POSE FOR INITIALIZATION OF SELF-LOCALIZATION

CROSS-REFERENCE TO RELATED APPLICATIONS

This application claims priority to European Patent Application No. EP 19213740.4, filed on 5 Dec. 2019.

FIELD

The present disclosure relates to methods and systems for determining an initial ego-pose for initialization of self-localization, for example of a vehicle.

BACKGROUND

Self-localization is the most important part of many autonomous driving applications. There are various methods to solve the ego-localization problem such as using the Global Navigation Satellite Systems (GNSS), dead reckoning, or simultaneous localization and mapping (SLAM) methods.

The self-localization problem may be classified into two main groups of local self-localization and global self-localization.

If the initial ego-pose is unknown, then a global self-localization may be performed. Assuming a known initial ego-pose results in a local self-localization. For example, if GNSS signals are not available, the initial pose must be determined using other means.

Accordingly, there is a need to provide efficient and reliable methods for determining the initial pose of a vehicle, even when GNSS signals are not available.

SUMMARY

In one aspect, the present disclosure is directed at a computer-implemented method for determining an initial ego-pose for initialization of self-localization including: providing a plurality of particles in a map; grouping the particles in a plurality of clusters, each cluster comprising a respective subset of the plurality of particles; during particle filtering, injecting particles (systematically) based on the plurality of clusters; and determining an initial ego-pose based on the particle filtering.

In other words, particles may be (systematically) injected based on cluster tracking in the case of filter divergence.

According to another aspect, the computer-implemented method includes determining a mean value and a variance of the respective locations of the respective subject of particles for each of the clusters.

It has been found that tracking the mean value and the variance of each cluster provides for efficient data management, while keeping the processing effort low. With updating the mean value and the variance, information about the location (or area) of each cluster may be tracked efficiently. This may be even true for situations where the particles of the cluster are not present anymore, and where particle injection is necessary. With the updated mean value and variance, information is available about where the cluster would be, as if the particles would still be present, and thus, this information may be used for particle injection.

According to another aspect, injecting particles based on the plurality of clusters comprises injecting the particles based on the respective mean value and the respective variance. For example, for each cluster, the particles may be injected at a location where the cluster would be according to the updated mean value of the cluster and the updated variance of the cluster, even if the particles of the cluster are no longer present.

According to another aspect, the computer-implemented method includes updating the respective mean value for each of the clusters based on a motion model.

By using a motion model, for example of the vehicle for which self-localization is to be carried out, the motion of the vehicle may be used to update the location of the cluster, which may be represented by updating the mean value of the cluster (in other words: the center of gravity of the cluster).

According to another aspect, the computer-implemented method includes updating the respective variance for each of the clusters based on an uncertainty propagation law with respect to the ego-pose uncertainty.

By updating the respective variance for each of the clusters, the variance for each of the clusters may increase over time (which may correspond to an increased area of the cluster), which may represent the uncertainty of the location.

According to another aspect, the plurality of particles are provided based on a random distribution over the map and/or based on an estimate of the ego-pose.

If no information is available for the ego-pose, then a random distribution over the map may be provided. Otherwise, a distribution which is more focused on the estimate of the ego-pose may be used.

According to another aspect, performing the particle filtering includes sample distribution, prediction, updating, and re-sampling. By predicting the particles, a location of each of the particles in a next time step may be determined. By updating, the samples are weighted considering the map and sensor observation. By re-sampling, the locations of the particles may be represented by a suitable set of samples (in other words: particles) for the subsequent time step.

According to another aspect, the particles are grouped into the plurality of clusters based on a numbers of particles in a potential cluster. For example, clustering may be carried out repeatedly (or iteratively), until the number of particles in the potential clusters fulfils a pre-determined criterion, for example, until the number of particles in each of the clusters is above a pre-determined threshold (in other words: until each cluster includes at least a pre-determined number of particles).

According to another aspect, the particles are grouped into the plurality of clusters based on a numbers of potential clusters. For example, clustering may be carried out repeatedly (or iteratively), until the number of clusters fulfils a pre-determined criterion, for example, until the number of clusters is below a pre-determined threshold.

According to another aspect, the computer-implemented method includes exhausting a cluster if it is outside a region of interest. For example, if the cluster is outside the map, then it may be exhausted (in other words: the cluster may be deleted or removed from consideration). If a cluster is partially outside the region of interest, only the valid part of the cluster (in other words: the part of the cluster which is still inside the region of interest) may be used for particle injection.

According to another aspect, the computer-implemented method includes receiving electromagnetic radiation emitted from at least one emitter of a sensor system of a vehicle and reflected in a vicinity of the vehicle towards the sensor system. For example, the sensor system may include a radar sensor and/or a LiDAR sensor and/or an infrared sensor.

According to another aspect, the particle filtering is performed based on the received electromagnetic radiation and based on the map. Illustratively, by performing the weighting (updating) process according to a comparison of the information, for example distance and/or angle information, obtained based on the electromagnetic radiation, with the information on static objects represented in the map, estimates of the location may be obtained.

According to another aspect, the initial ego-position is determined based on entropy based monitoring based on a binary grid.

In another aspect, the present disclosure is directed at a computer system including a plurality of computer hardware components configured to carry out several or all steps of the computer-implemented method described herein. The computer system can be part of a vehicle.

The computer system may comprise a plurality of computer hardware components (for example a processing unit, at least one memory unit and at least one non-transitory data storage). It will be understood that further computer hardware components may be provided and used for carrying out steps of the computer-implemented method in the computer system. The non-transitory data storage and/or the memory unit may comprise a computer program for instructing the computer to perform several or all steps or aspects of the computer-implemented method described herein, for example using the processing unit and the at least one memory unit.

In another aspect, the present disclosure is directed at vehicle equipped with a sensor system adapted to receive electromagnetic radiation emitted from at least one emitter of a sensor system and reflected in a vicinity of the vehicle towards the sensor system, and a computer system, for example a computer system as described above, for determining an initial ego-pose for initialization of self-localization of the vehicle.

In another aspect, the present disclosure is directed at a non-transitory computer readable medium comprising instructions for carrying out several or all steps or aspects of the computer-implemented method described above. The computer readable medium may be configured as: an optical medium, such as a compact disc (CD) or a digital versatile disk (DVD); a magnetic medium, such as a hard disk drive (HDD); a solid state drive (SSD); a read only memory (ROM), such as a flash memory; or the like. Furthermore, the computer readable medium may be configured as a data storage that is accessible via a data connection, such as an internet connection. The computer readable medium may, for example, be an online data repository or a cloud storage.

The present disclosure is also directed at a computer program for instructing a computer to perform several or all steps or aspects of the computer-implemented method described above.

BRIEF DESCRIPTION OF THE DRAWINGS

Exemplary embodiments and functions of the present disclosure are described herein in conjunction with the following drawings, showing schematically.

DETAILED DESCRIPTION

Figure 1:
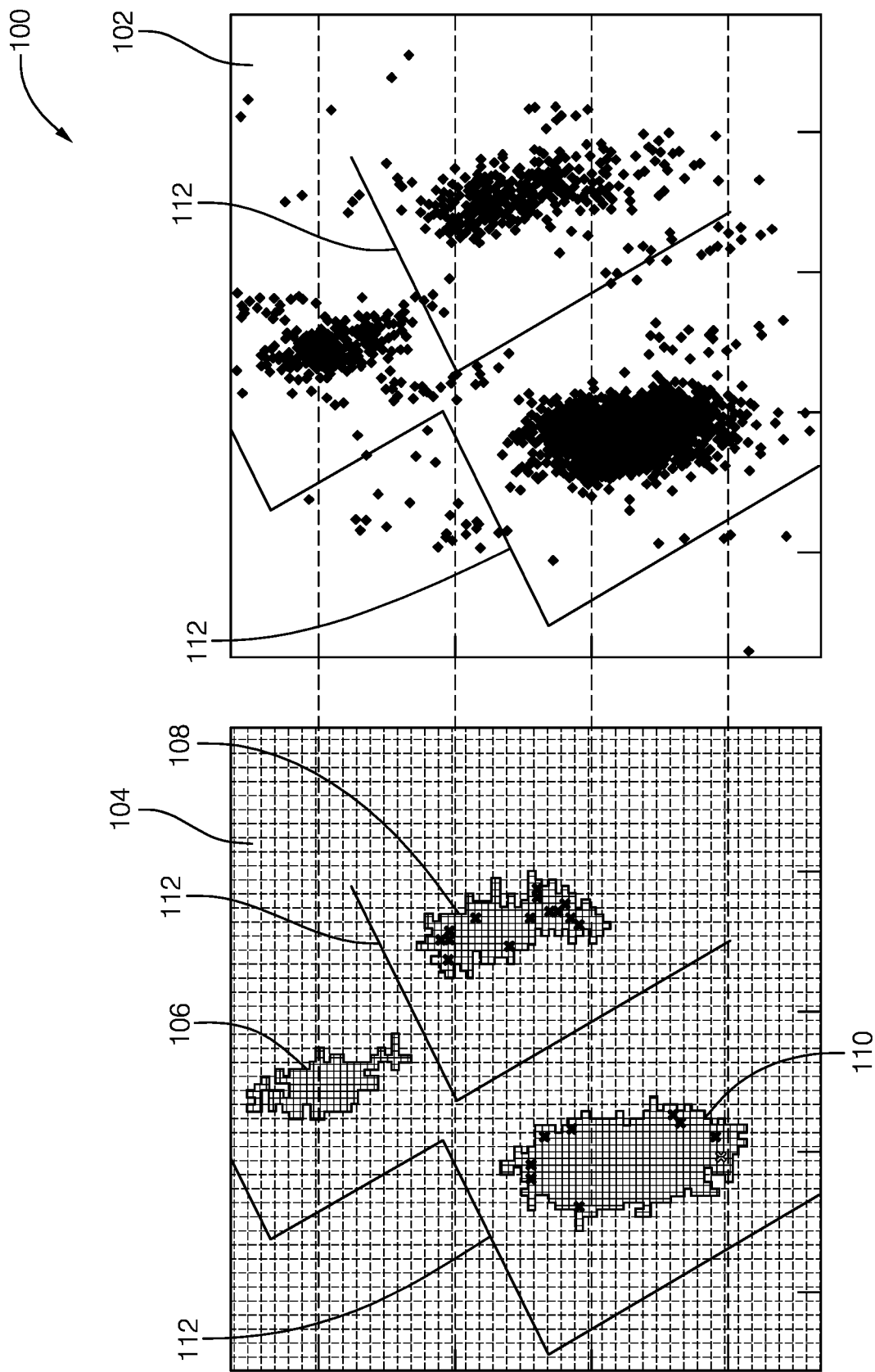
FIG. 1 is an illustration of particle clustering of a map with particles according to various embodiments.

According to various embodiments, a map may be used for finding the initial pose of a vehicle, such as where the vehicle starts to move. For example, the map may be an OpenStreetMap and/or an occupancy grid map. The map may include information on static objects, such as walls, pillars, tress, houses or guard rails. Information indicated by the map may be provided on a discrete grid (so that the map may also be referred to as a grid). Particle filtering may be used for finding the initial pose of the vehicle. A map may be input into the particle filter and then the filter may be initialized. The initialization process may be the distribution of the samples (in other words: particles) in the entire region, where the initial ego-pose is unknown. While theoretically the region could be the whole world, usually some coarse information about the initial ego-pose is available, such as "The vehicle is in a parking garage" or "The vehicle is in this area of the city".

Based on this initial coarse information, samples may be distributed within the map of the area and particle filtering may be performed. Particle filtering may have the following steps: filter initialization (in other words: sample distribution), prediction, updating (in other words: weighting), and re-sampling, like will be described in more detail below.

After initialization, the movement of each particle may be predicted based on the vehicle movement information (for example yaw rate and velocity) and a vehicle model. Based on the updated sample poses, each sample may be weighted based on a comparison between the sensor observation (for example radar, camera, or LiDAR) and the map. Due to this weighting, some samples may get a higher weight than the other samples. The domination of the particles with a higher weight to the other samples may lead to a problem, called "degeneracy". To avoid this problem, re-sampling may be performed which focuses the samples to the regions where the sample weights are higher, since the vehicle is more likely to be located in these regions. After some sample times, the particles are more concentrated in one region and the initial ego-pose is considered as found. The size of the recognized area can be defined by the user, for example the user can define an area of 5 m$^2$ for the initialization success. If all particles are concentrated in an area smaller or equal to that value, the filtering process for the initialization may be considered done.

However, some factors may lead to filtering problems or even filter divergence, which means that the filter converges to a wrong initial pose. Some common problems, which may be faced during the filtering process are impoverishment (which refers to a fast and high concentration of the particles in a small region), degeneracy (which refers to a situation where the weights of many samples are close to zero, so that there is a large difference between sample weights), or filter divergence (which refers to a complete divergence of the filter, so that initialization fails).

The source of particle divergence may be sparse and noisy measurements, for example in a case of using radars, when the observations are sparse.

For avoiding the particle filter divergence, strategies such as particle injection based on different sensor system may be used, for example based on radars, LiDAR, camera or a combination of these sensors. If the divergence is recognized, new particles are injected into the filter in the entire initialization area. However, this particle injection into the filter in the entire initialization area is considered a filter reset, which should be avoided.

According to various embodiments, clustering of particles may be applied, which may overcome the divergence problem of the particle filtering in case of noisy and sparse measurements or inaccurate map. A binary grid may be provided over the entire region with a pre-determined resolution. A binary clustering may be performed for all particles in each sample time. Clusters which have a number of samples over a pre-determined threshold may be considered. All clusters may represent the map regions where the probability of the ego-pose is high according to the measurements until the clustering time.

FIG. 1 shows an illustration 100 of particle clustering of a map 102 with particles according to various embodiments, and the generated clusters 106, 108, 110 for an example scene with several obstacles 112 (for example walls), so as to provide a clustered map 104.

The particles of the map 102 may be clustered with a binary grid (for example with a resolution of 10 cm in x direction and 10 cm in y direction). The three clusters 106, 108, 110 may be generated after the clustering process.

The particle filter may be monitored by its parameters such as effective sample size and entropy information. In parallel, the clusters may be updated, for example by updating the Gaussian parameters representing the clusters. The particle filter is initialized, if the particles are concentrated in a certain area, for example 5 m². The cluster may be used in case of particle injection only, and may not be used for any other part of the particle filtering.

Figure 2:
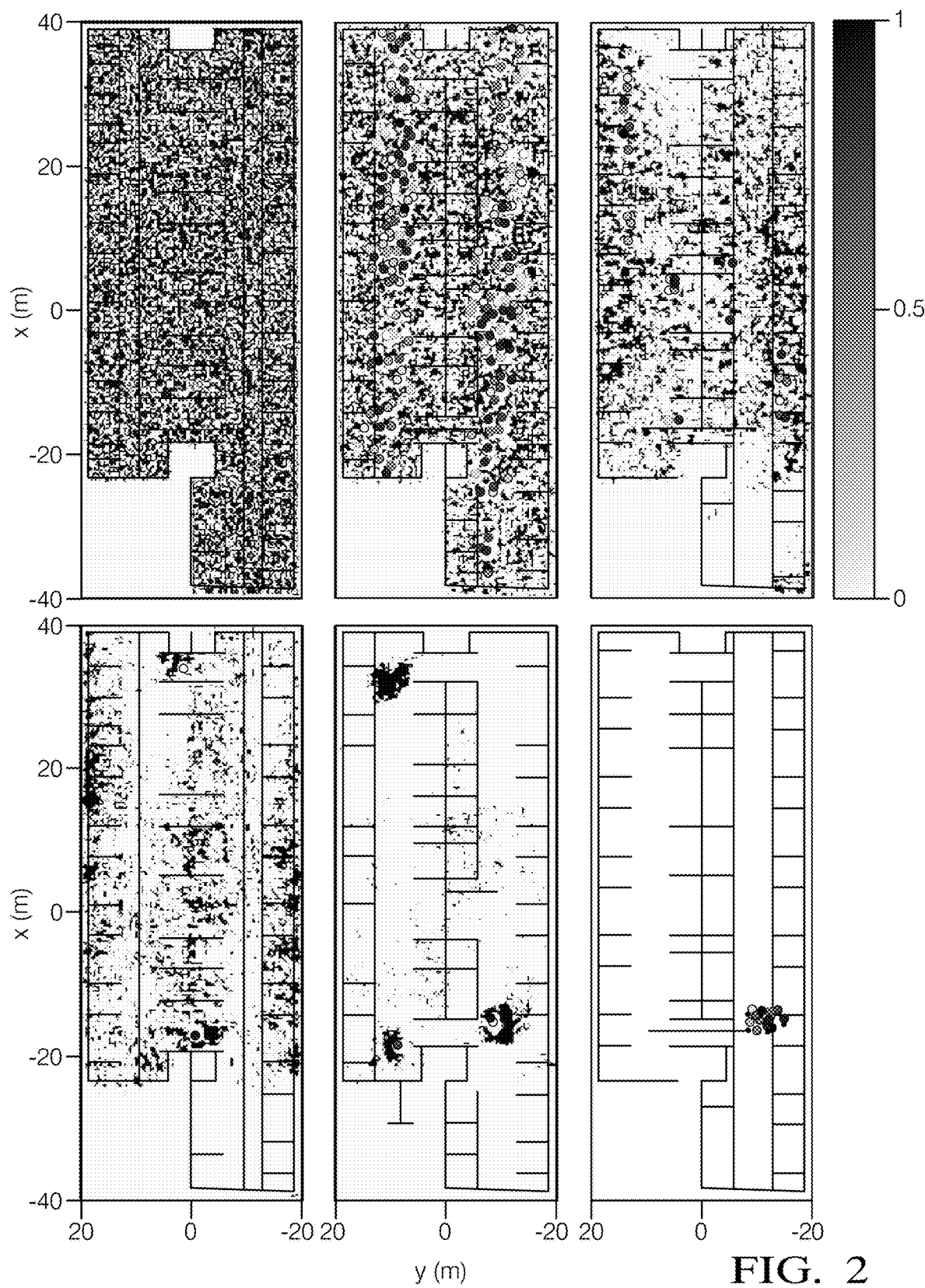
FIG. 2 is an illustration of a scenario of ego-pose initialization with particle filtering according to various embodiments in a parking lot with three generated clusters as an example of the parallel filtering according to various embodiments.

FIG. 2 shows an illustration 200 of a scenario of ego-pose initialization with particle filtering according to various embodiments in a parking lot with three generated clusters (denoted as "1", "2", and "3") as an example of the parallel filtering according to various embodiments. In the example shown in FIG. 2 above, the samples are clustered in the middle-down figure.

The symmetrical form of the initialization area, for example in this scenario the parking lot, and accordingly the ambiguity of the observations in opposite side of the map presents a major challenge for the particle filtering. The symmetry leads to survival of the clusters within the re-sampling process. The effective sample size of the first cluster reduces continuously with time as it moves towards the map boundaries. Due to the affinity of the observations on two corners of the parking lot for the second cluster and the third cluster, their samples obtain almost alike weights within the clustering. With more dense measurements from the lower right corner of the map, an effective samples size increment is observed for the second cluster.

In another embodiment, the clusters may be used for cluster tracking of a particle filter for divergence avoidance using Gaussian parameters, for example mean value and variance (or standard deviation), like will be described in the following.

For recovering the filter after divergence, injection methods based on different sensor system may be used, for example radars, LiDAR, camera or a combination of these sensors.

According to various embodiments, systematic particle injection may be performed based on a clustering of the particles, in case of filter divergence.

The number of clusters may have a threshold and if this threshold reaches a certain number, then the clusters are tracked in the following way. In the case of filter divergence, new samples may solely be injected in the areas related to the clusters (for example in an area with a width (or diameter) which is based on the variance, for example equal to the variance, around the mean value) to make the injection process efficient.

According to various embodiments, cluster tracking based on their Gaussian distribution parameters (for example mean value and variance) may be carried out.

The change rate of the entropy information is controlled to capture possible exceeding of the defined threshold. Significant changes appear not only by filter divergence but also after warm up process. By observing a considerable modification of $\varepsilon$, the $\varepsilon$ and $M_{eff}$ are checked with respect to predefined thresholds. The effective sample size and the entropy information must not fall below, $k_1 \cdot M_{eff}$ and $k_2 \cdot \varepsilon_{max}$, respectively, with $k_1$ and $k_2$ as tuning parameters and $$\varepsilon_{max} = -k_2 \cdot \sum_{m=1}^{M} M^{-1} \log(M^{-1})$$

as the maximum entropy. After the warm up process, the entropy information reduces but an increment of $M_{eff}$ is detected. A filter divergence is likely to have occurred, if a significant reduction in $\varepsilon$ is monitored and $M_{eff}$ shifts away from M in addition to the falling of $\varepsilon$ below the threshold level. In such a case the particle deviate from the true belief which means a severe degeneracy and new particles are injected.

The prerequisite of the injection is that the clustering is already performed, otherwise no injection will be performed. In such a case, clustering may be performed first, and then the injection may be carried out.

According to various embodiments, it may be assumed that each particle cluster is Gaussian distributed. The Gaussian distribution parameters (for example the mean value and the variance) of the clusters may be retained. The Gaussian distribution parameters may be predicted in each sample time using the vehicle model and the ego-pose covariance matrix. Thus, the variance of the cluster is enlarged with time due to the uncertainty of the ego-pose. The functionality of the particle filter may be monitored by the effective sample size and the entropy. In parallel, the Gaussian clusters may be updated continuously. When recognizing a filter divergence, new particles are injected systematically solely into the clusters to recover the filter. In this way, the particle filter is not reset and the filter can be recovered with efficient particle injection.

The update process of the clusters may be computationally efficient as solely two parameters per cluster may be updated in each sample time.

Figure 3:
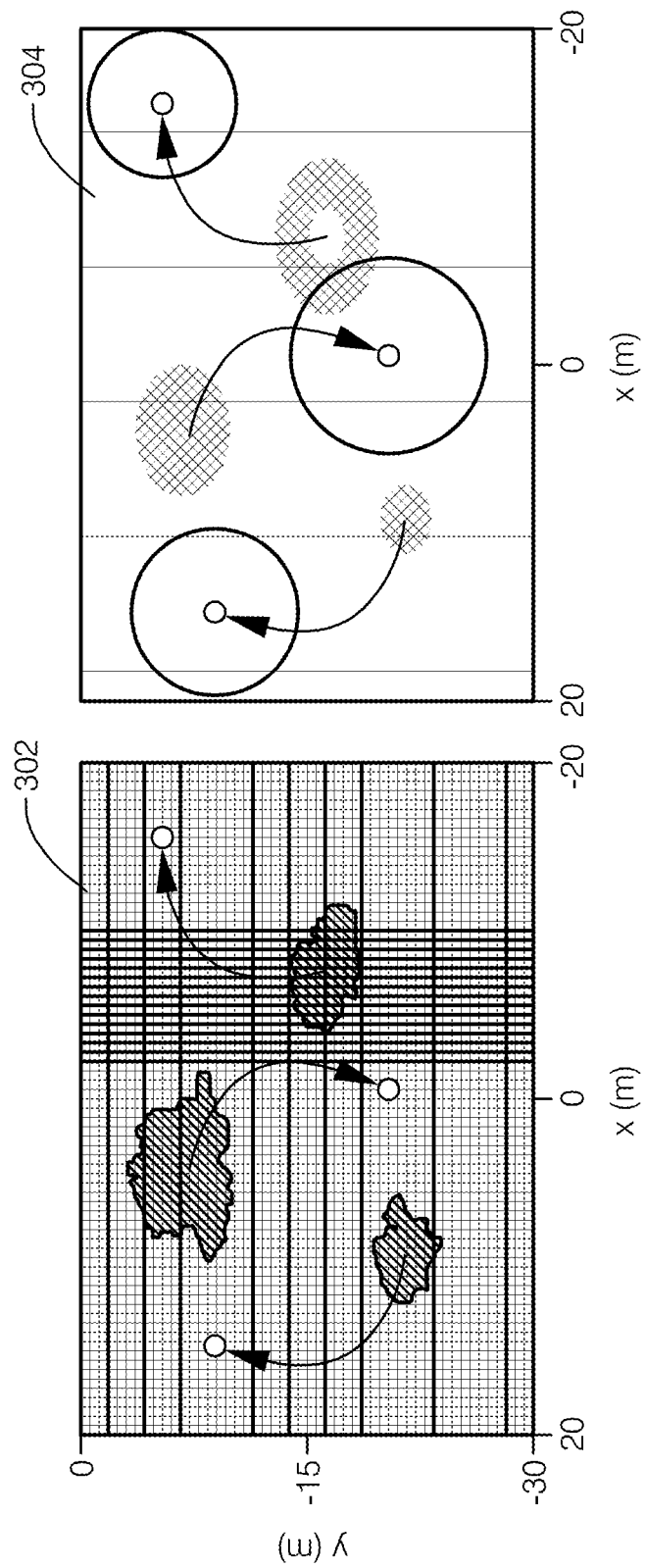
FIG. 3 is an illustration of cluster tracking according to various embodiments.

FIG. 3 shows an illustration 300 of cluster tracking according to various embodiments. The left map 302 illustrates the particle clusters and their tracked route (indicated by white arrows) which is generated based on motion parameters and the vehicle model. The cluster variances (indicated by white circles in the right mag 304) may be updated based on the ego-pose uncertainty with the error propagation principle. In the right map 304, the updated cluster mean value (indicated by white dots) and variances (indicated by white circles) are shown.

In case of divergence, one or more (or all) of these updated clusters may be used for injecting new particles. In case that a cluster is completely outside of the valid region, this cluster is not used anymore for the injection. If this cluster is partly outside of the valid region, solely the valid part is filled with new injected particles.

Figure 4:
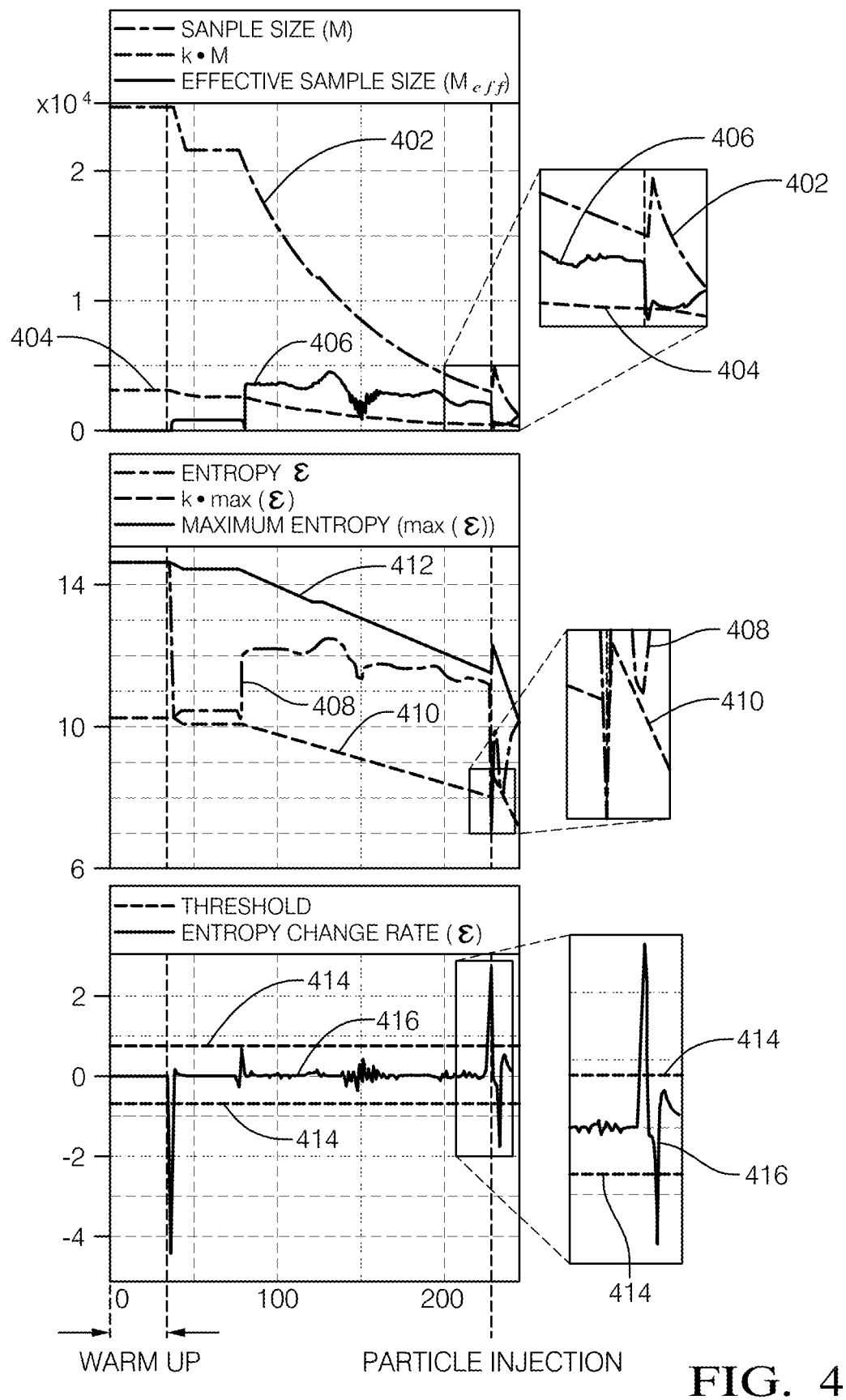
FIG. 4 is an illustration of particle filter monitoring parameters according to various embodiments.

FIG. 4 shows an illustration 400, where particles are manually removed in order to analyze the method according to various embodiments. For testing purposes, a few sample times after clustering, the particles located in the correct vehicle ego-pose are eliminated manually. In this scenario, three clusters are generated and tracked for the potentially particle divergence. The monitoring filter parameters, namely the effective sample size, entropy information and its change rate, are illustrated in FIG. 4.

FIG. 4 shows an illustration 400 of particle filter monitoring parameters according to various embodiments. A sample size M 402, kM 404 (wherein k is a threshold), an effective sample size 406, and entropy ε 408, a product of k and a maximum entropy 410, a maximum entropy 412, thresholds 414, and an entropy change rate 416 are illustrated. If the parameters exceed the corresponding thresholds after clustering process, a systematic injection is fulfilled into the tracked clusters.

During the warm up process and before the particles are clustered, no injection is fulfilled. As it can be considered, there are two sample times for significant parameter changes: Once at the initialization time and once after particle elimination.

A systematic injection is performed after recognition of filter divergence in the regions with high probability of the ego-pose, i.e., in the tracked clusters. After injection, parameters may be within the threshold bounds, possibly after deviations. Without a systematic injection and by resetting the filter, the time is increased by 100% to achieve the same sample distribution at the divergence time.

Figure 5:
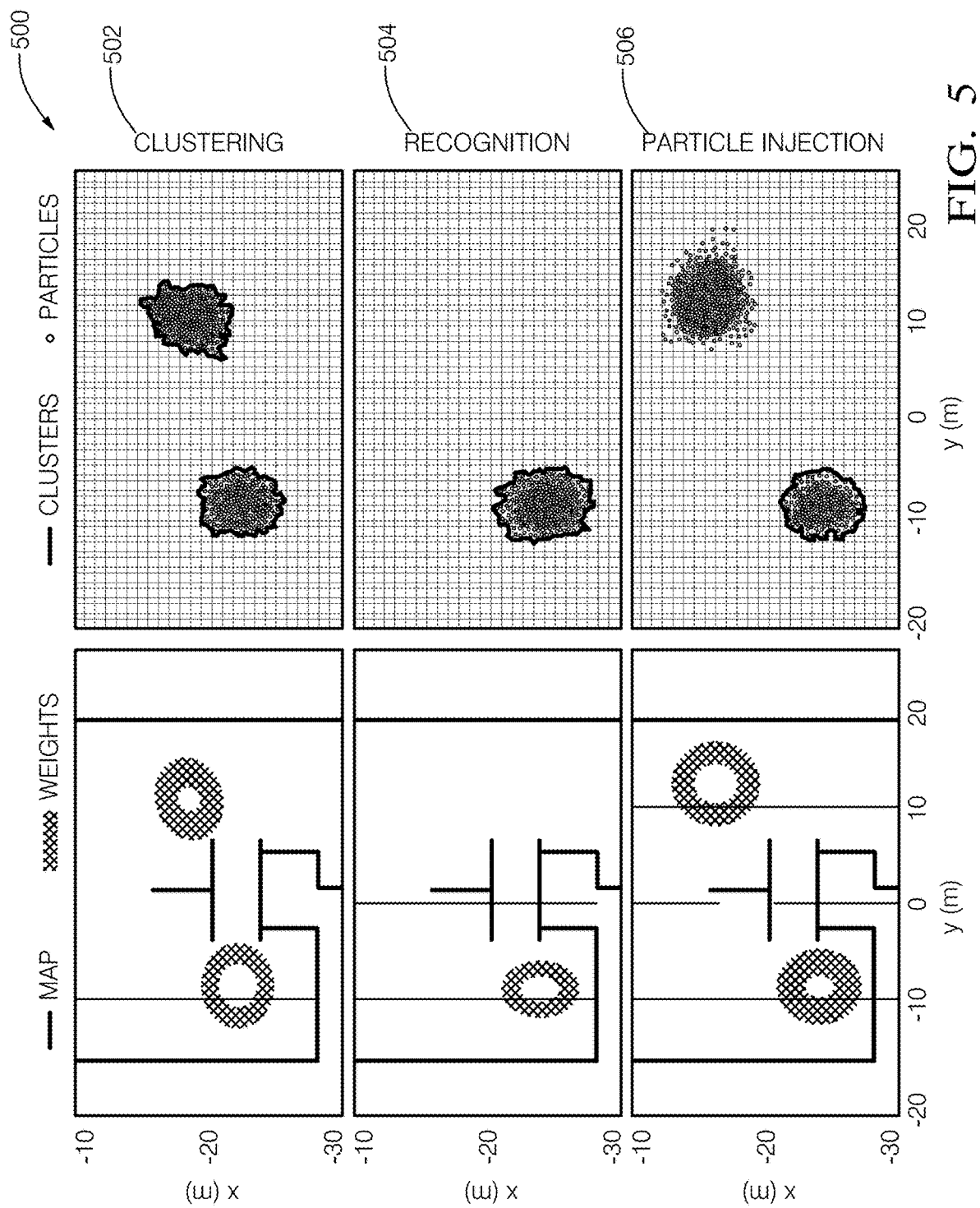
FIG. 5 is an illustration of the injection process after recognizing the filter divergence into the tracked clusters according to various embodiments.

FIG. 5 shows an illustration 500 of the injection process after recognizing the filter divergence into the tracked clusters according to various embodiments. The three levels of processing, including clustering 502, divergence recognition 504 and systematic particle injection 506 based on Gaussian parameters of the clusters are illustrated. It is to be noted that in the recognition stage 504, all particles of one cluster, which contains the true belief, are removed manually for demonstration purposes. In the particle injection stage 506, particles are injected at the location where the cluster is assumed to be (based on the updated mean value of the cluster and the updated variance of the cluster), even though the particles of the cluster are no longer present.

Figure 6:
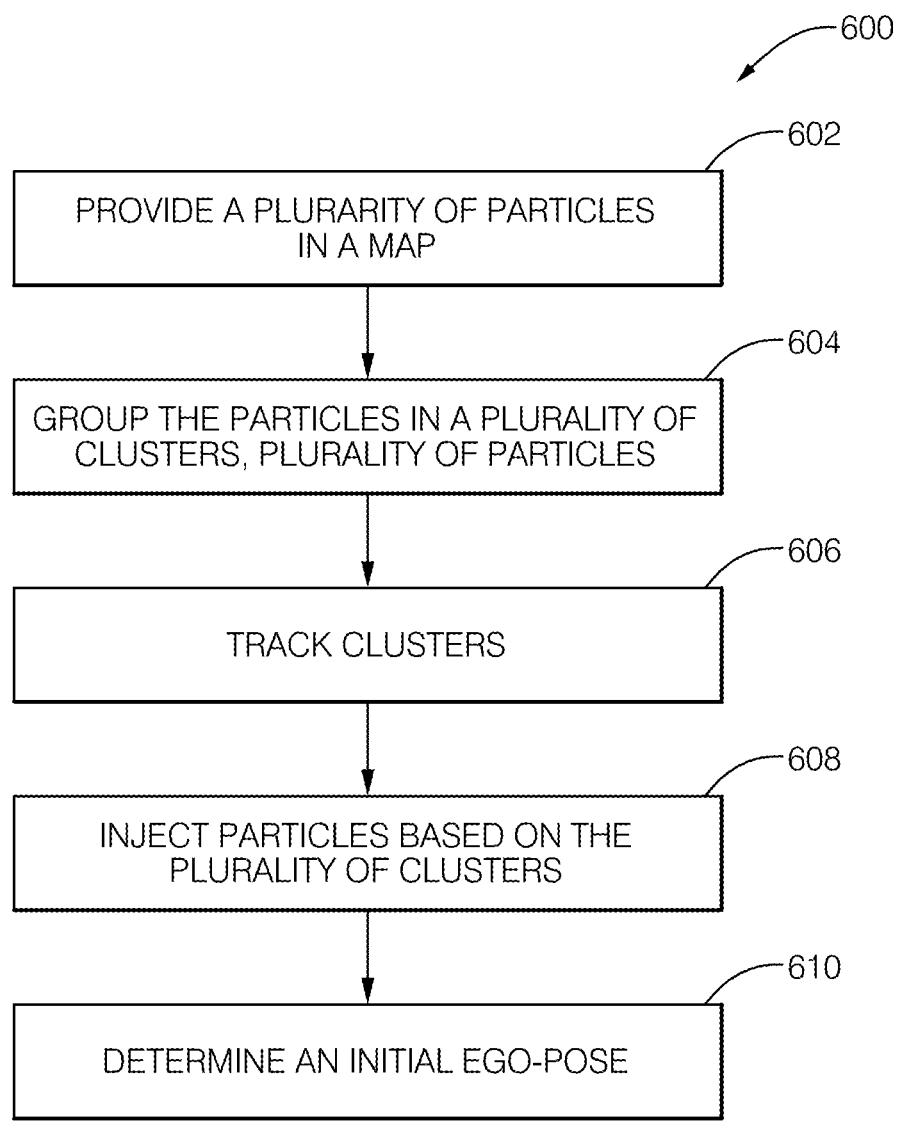
FIG. 6 is a flow diagram illustrating a method for determining an initial ego-pose for initialization of self-localization according to various embodiments.

FIG. 6 shows a flow diagram 600 illustrating a method for determining an initial ego-pose for initialization of self-localization according to various embodiments. At 602, a plurality of particles may be provided in a map. At 604, the particles may be grouped in a plurality of clusters, each cluster comprising a respective subset of the plurality of particles. At 606, cluster tracking may be performed, for example by updating the respective Gaussian parameters (like mean value and variance) of each of the clusters. At 608, during particle filtering, particles may be injected based on the plurality of clusters. At 610, an initial ego-pose may be determined based on the particle filtering.

According to various embodiments, a mean value and a variance of the respective locations of the respective subject of particles may be determined for each of the clusters.

According to various embodiments, particles may be injected based on the plurality of clusters comprises injecting the particles based on the respective mean value and the respective variance.

According to various embodiments, the respective mean value for each of the clusters may be updated based on a motion model.

According to various embodiments, the respective variance for each of the clusters may be updated based on an uncertainty propagation law with respect to the ego uncertainty.

According to various embodiments, the plurality of particles may be provided based on at least one of a random distribution over the map, or an estimate of the ego-pose.

According to various embodiments, performing the particle filtering may include: sample distribution, prediction, updating, and re-sampling.

According to various embodiments, the particles may be grouped into the plurality of clusters based on at least one of a numbers of particles in a potential cluster, or a numbers of potential clusters.

According to various embodiments, a cluster may be exhausted if it is outside a region of interest. According to various embodiments, a part of a cluster may be ignored (in other words: may not be used for particle injection) if the part of the cluster is outside a region of interest.

According to various embodiments, electromagnetic radiation emitted from at least one emitter of a sensor system of a vehicle and reflected in a vicinity of the vehicle towards the sensor system may be received.

According to various embodiments, the particle filtering may be performed based on the received electromagnetic radiation and based on the map.

According to various embodiments, the initial ego-position may be determined based on at least one of a pre-determined number threshold for the number of clusters or a pre-determined size threshold for the respective spatial sizes of the clusters.

According to various embodiments, the initial ego-position may be determined based on entropy based monitoring based on a binary grid.

Each of the steps 602, 604, 606, 608 and the further steps described above may be performed by computer hardware components.

The invention claimed is:

1. A computer-implemented method for determining an initial ego-pose for initialization of self-localization, the method comprising:
   providing a plurality of particles in a map;
   grouping the particles in a plurality of clusters with a binary grid, each cluster comprising a respective subset of the plurality of particles;
   determining a mean value and a variance of respective locations of a respective subject of particles for each of the clusters;
   during particle filtering, injecting particles when an entropy change rate exceeds a predetermined threshold, wherein the injecting is based on the plurality of clusters, based on the respective mean value, and based on the respective variance; and
   determining an initial ego-pose based on the particle filtering and based on entropy-based monitoring based on the binary grid.

2. The computer-implemented method of claim 1, comprising updating the respective mean value for each of the clusters based on a motion model.

3. The computer-implemented method of claim 1, comprising updating the respective variance for each of the clusters based on an uncertainty propagation law.

4. The computer-implemented method of claim 1, wherein the plurality of particles are provided based on at least one of a random distribution over the map, or an estimate of the ego-pose.

5. The computer-implemented method of claim 1, wherein performing the particle filtering comprises: sample distribution, prediction, updating, and re-sampling.

6. The computer-implemented method of claim 1, wherein the particles are grouped into the plurality of clusters based on at least one of a numbers of particles in a potential cluster, or a numbers of potential clusters.

7. The computer-implemented method of claim 1, comprising
exhausting a cluster if it is outside a region of interest and/or
exhausting a part of a cluster if the part of the cluster is outside a region of interest.

8. The computer-implemented method of claim 1, comprising receiving electromagnetic radiation emitted from at least one emitter of a sensor system of a vehicle and reflected in a vicinity of the vehicle toward the sensor system.

9. The computer-implemented method of claim 8, wherein the particle filtering is performed based on the received electromagnetic radiation and based on the map.

10. A computer system configured to carry out the computer-implemented method of claim 1.

11. A vehicle, comprising:
the computer system of claim 10, and
a sensor system adapted to receive electromagnetic radiation emitted from at least one emitter of the sensor system and reflected in a vicinity of the vehicle toward the sensor system, wherein the computer system is configured for determining the initial ego-pose for initialization of self-localization of the vehicle.

12. A non-transitory computer readable medium comprising instructions for carrying out the computer-implemented method of claim 1.

* * * * *